United States Patent [19]

Schmidt et al.

[11] Patent Number: 4,765,938
[45] Date of Patent: Aug. 23, 1988

[54] APPARATUS AND METHOD FOR THE APPLICATION OF A PLASTIC LINER TO A FLANGED PIPE ELBOW

[75] Inventors: Daniel E. Schmidt, Midland; Robert P. Moeller, Bay City, both of Mich.

[73] Assignee: The Dow Chemical Company, Midland, Mich.

[21] Appl. No.: 16,973

[22] Filed: Feb. 25, 1987

Related U.S. Application Data

[63] Continuation of Ser. No. 781,815, Sep. 30, 1985, abandoned.

[51] Int. Cl.4 .................. B29C 45/14; B29C 45/67; B29C 45/73
[52] U.S. Cl. .................. 264/269; 29/527.2; 249/63; 249/83; 249/144; 249/185; 264/267; 264/328.16; 285/55; 285/179; 425/127; 425/188; 425/393; 425/414; 425/450.1; 425/468; 425/547; 425/589
[58] Field of Search .......... 264/36, 267, 269, 328.16; 425/127, 188, 393, 414, 450.1, 468, 547, 589, DIG. 10; 249/63, 83, 144, 185; 29/527.2; 285/55, 179, 288, 291

[56] References Cited

U.S. PATENT DOCUMENTS

| 1,596,114 | 8/1926 | Murray | 285/55 |
|---|---|---|---|
| 1,964,123 | 6/1934 | Kaiser | 285/55 X |
| 2,560,114 | 7/1951 | Kennon | 285/55 X |
| 3,093,864 | 6/1963 | Waldron et al. | 249/107 |
| 3,148,896 | 9/1964 | Chu | 285/55 |
| 3,206,530 | 9/1965 | Boteler | 264/269 |
| 3,235,290 | 2/1966 | Young | 285/55 |
| 3,691,617 | 9/1972 | Burnett | 285/55 X |
| 3,796,407 | 3/1974 | Brown | 249/63 |
| 3,921,673 | 11/1975 | Pero | 285/55 X |
| 4,184,834 | 1/1980 | Barber | 249/144 X |
| 4,447,076 | 5/1984 | Evans | 285/55 |

FOREIGN PATENT DOCUMENTS

| 53-42061 | 11/1978 | Japan | 249/144 |
|---|---|---|---|
| 434221 | 8/1935 | United Kingdom | 264/269 |

Primary Examiner—Jeffery Thurlow
Assistant Examiner—Leo B. Tentoni
Attorney, Agent, or Firm—Robert B. Ingraham; Thomas D. Zindrick

[57] ABSTRACT

An injection molding apparatus is used to line flanged pipe elbows. The pipe elbow is clamped by the flanges to two pivotted platens, one of which has a curved mandrel to shape the inside of the elbow lining.

9 Claims, 4 Drawing Sheets

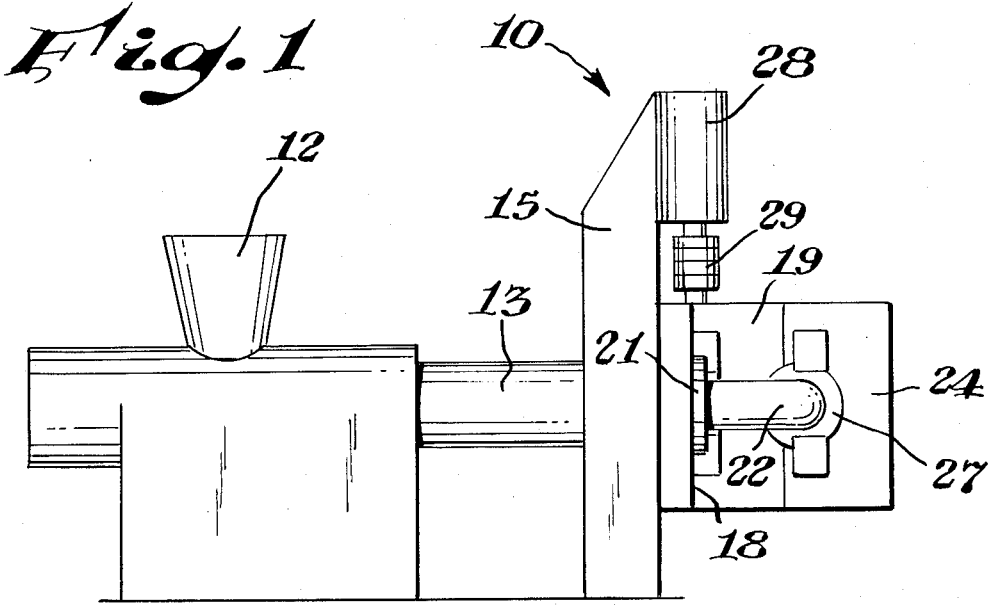
Fig. 1
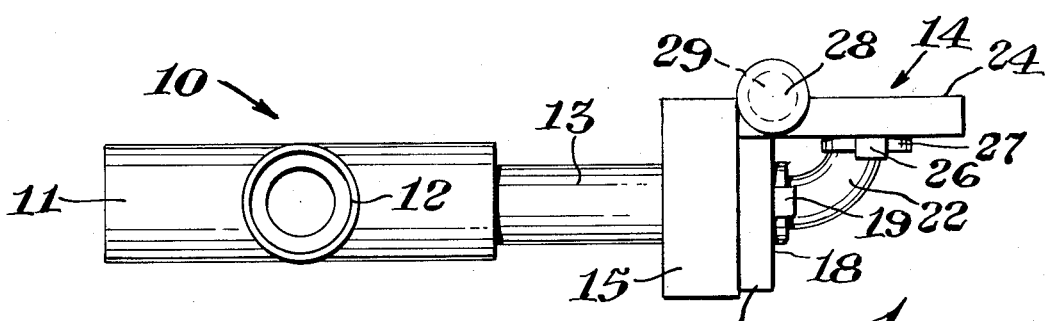
Fig. 2
Fig. 7

APPARATUS AND METHOD FOR THE APPLICATION OF A PLASTIC LINER TO A FLANGED PIPE ELBOW

CROSS-REFERENCE TO RELATED APPLICATION

This is a continuation of application Ser. No. 781,815, filed Sept. 30, 1985, now abandoned.

In many instances it is desired to employ corrosion resistant piping for conveying various materials. One variety of corrosion resistant piping is the so-called plastic lined pipe wherein a synthetic resinous thermoplastic layer is disposed within the pipe. In many instances such plastic lined pipe is connected by means of flanges which have on the mating surface of the flanges a portion of the plastic lining. Such piping requires conventional fittings such as elbows and the like. Various lining techniques have been employed to provide a desired liner within an elbow.

U.S. Pat. No. 1,596,114 discloses fabricating an elbow by first shaping a liner and subsequently forming the outer conduit by welding with the liner in place. U.S. Pat. Nos. 1,964,123 and 2,560,114 disclose the use of split housing wherein the housing portions are bolted together to enclose the liner.

U.S. Pat. No. 3,093,864 discloses the lining of a valve with thermoplastic resin utilizing a multi-part mandrel and flanges which are bolted together.

U.S. Pat. No. 3,148,896 discloses the lining of a Tee with plastic by inserting a liner, heating and expanding the liner with internal pressure and subsequently forming desired flanges.

U.S. Pat. No. 3,235,290 discloses glass lining by the insertion of a tubular liner which is heated and subsequently expanded by means of internal pressure to conform to the elbow.

U.S. Pat. No. 3,691,617 discloses the lining of an elbow by centrally pushing the liner into the elbow to form a generally cylindrical liner into a segment of a torus.

It would be desirable if there were available apparatus and method which would permit the rapid lining of pipe elbows with a thermoplastic material.

It would be desirable if there were available improved apparatus and method for lining pipe elbows with thermoplastic resin to provide a generally uniform product.

It would also be desirable if there were available an improved apparatus and method for the lining of pipe elbows to provide linings of controlled thickness in a relatively rapid manner.

These benefits and other advantages in accordance with the present invention are achieved by employing an apparatus comprising a first clamping platen, the first clamping platen having a first face, the first clamping platen defining a passageway adapted to receive and transmit heat plastified synthetic resinous thermoplastic material through said first face; a clamping means in cooperative combination with said first face, said clamping means adapted to engage a flange of a pipe elbow and maintain the flange of the pipe elbow in sealing engagement with said first face in a location wherein material from the resin receiving passageway can enter the elbow; a second clamping platen having a first face, the first and second platens being hingedly affixed to each other, the second clamping platen being selectively positionable relative to the first platen wherein the first and second platens are generally pivoted relative to one another; the second platen having disposed thereon an arcuate mandrel adapted to enter a passageway within a pipe elbow clamped on the first face of the first platen; the mandrel having terminal end remote from the first face of the second platen, the terminal end of the mandrel adapted to engage a portion of the first face of the first platen in a region of the resistant passageway, the first face of the second platen having associated therewith clamping means adapted to engage the flange of a pipe elbow clamped to the first face of the first platen; means to pivotally position the second platen relative to the first platen.

Also contemplated within the scope of the present invention is a method for the lining of pipe elbows with a synthetic resinous thermoplastic material, the method comprising clamping a flanged elbow between first and second pivotally attached platens, the elbow being clamped by flanges of the elbow, an arcuate mandrel supported by the second platen inserted into the elbow clamped on the first platen, clamping the flange of the elbow by a second platen, injecting a heat plastified synthetic resin into a space defined between the mandrel and elbow, cooling the injected synthetic resinous material to a temperature below its thermoplastic temperature, unclamping the flange of the elbow adjacent the mandrel supporting platen, withdrawing the mandrel from the elbow and unclamping the remaining clamped flange of the elbow.

Further features and advantages of the present invention will become more apparent from the following specification taken in connection with the drawing wherein:

FIG. 1 is a schematic side view of an apparatus in accordance with the invention;

FIG. 2 is a top view of the apparatus of FIG. 1;

FIG. 7 is a fractional sectional view of a stationary platen; and

Figure 3:
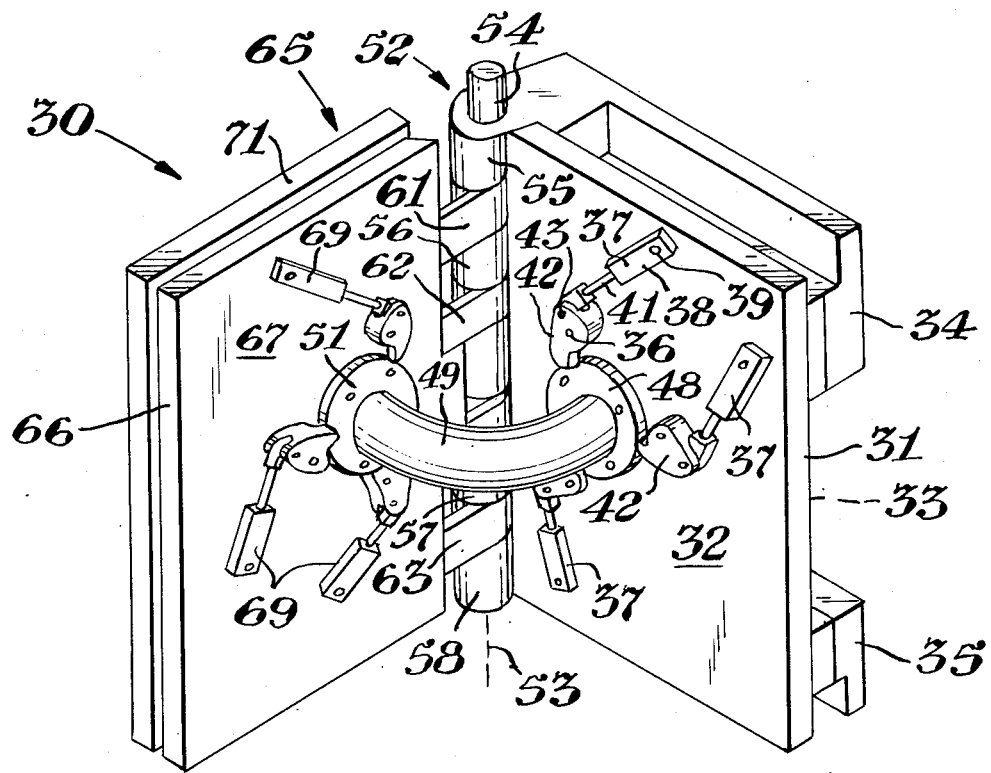
FIG. 3 is a representation of apparatus in accordance with the invention wherein clamp actuating lines have been omitted.

In FIGS. 1 and 2 there are schematically depicted side view and top view, respectively, of a molding apparatus generally designated by the reference numeral 10. The apparatus 10 comprises in cooperative combination an injection molding machine 11. The molding machine 11 has a hopper 12 adapted to receive heat plastifiable thermoplastic synthetic resinous material. The molding machine 11 has a barrel 13 adapted to discharge heat plastified synthetic resinous material. The barrel 13 remote from the machine 11 is in engagement with a molding assembly generally designated by the reference numeral 14. The molding assembly 14 is supported by means of a frame 15. The molding assembly 14 comprises a first or fixed platen 17 having a first face 18 remote from the injection molding machine 11. The first face 18 has disposed thereon clamping means 19. Disposed within the clamping means 19 is a flange 21 of a pipe elbow 22. A second platen 23 having a first face 24 is disposed generally normal to the face 18 of platen 17. The face 24 has associated therewith clamping means 26. Clamping means 26 are in engagement with flange 27 of the elbow 22. The platens 17 and 23 are hingedly affixed by means not shown and selectively positioned by means of a rotary actuator 28 connected to platen 23 by means of a coupling 29.

In FIG. 3 there is a schematic illustration of an apparatus designated by the reference numeral 30 for the lining of elbows and is generally equivalent to the assembly 14 of FIGS. 1 and 2. The apparatus 30 comprises a first platen 31. The platen 31 has a first face 32 and a second face 33. Affixed to the second face 33 are mounting blocks 34 and 35 adapted to engage a support such as support 15 of FIG. 1. The first face 32 of the platen 31 has affixed thereto three generally identical clamping means 37. The clamping means 37 comprises hydraulic cylinders 38 pivotally affixed to the platen 31 by a pivot 39. The cylinders 38 have an actuating shaft 41 in pivotal engagement, remote from the cylinder, with a cam 42 pivotally affixed to the actuating shaft 41 by pivot 43. Cam 42 is pivotally affixed to face 32 of platen 31 by means of pivot 36. As depicted in FIG. 3, the cams 42 are in engagement with a first flange 48 of a pipe elbow 49 having a second or remote flange 51. A hinge assembly 52 is affixed to one edge of the platen 32 and has an axis of rotation 53 which is generally concentric with the center of curvature of the elbow 49. The hinge assembly 52 comprises a shaft 54 rotatably supported by members 55, 56, 57 and 58 affixed to platen 31. A plurality of members 61, 62 and 63 are affixed to the shaft 54. Members 61, 62 and 63 have affixed thereto a second platen 65. The platen 65 comprises a first plate-like member 66 having a generally planar face 67. The planes of face 67 of the plate-like member 66 and face 32 of platen 31 when projected, generally pass through the axis of rotation 53. The face 67 has affixed thereto three clamping members 69 of generally like configuration to the clamping members 37, disposed on face 32 of platen 31. As depicted in FIG. 3, the cam portions of the clamping members 69 are in engagement with a flange 51 of the elbow 49. Platen 65 has a backing or support plate 71 which is rigidly affixed to the members 61, 62 and 63 and resiliently supports the plate member 66 by means not shown.

Figure 4:
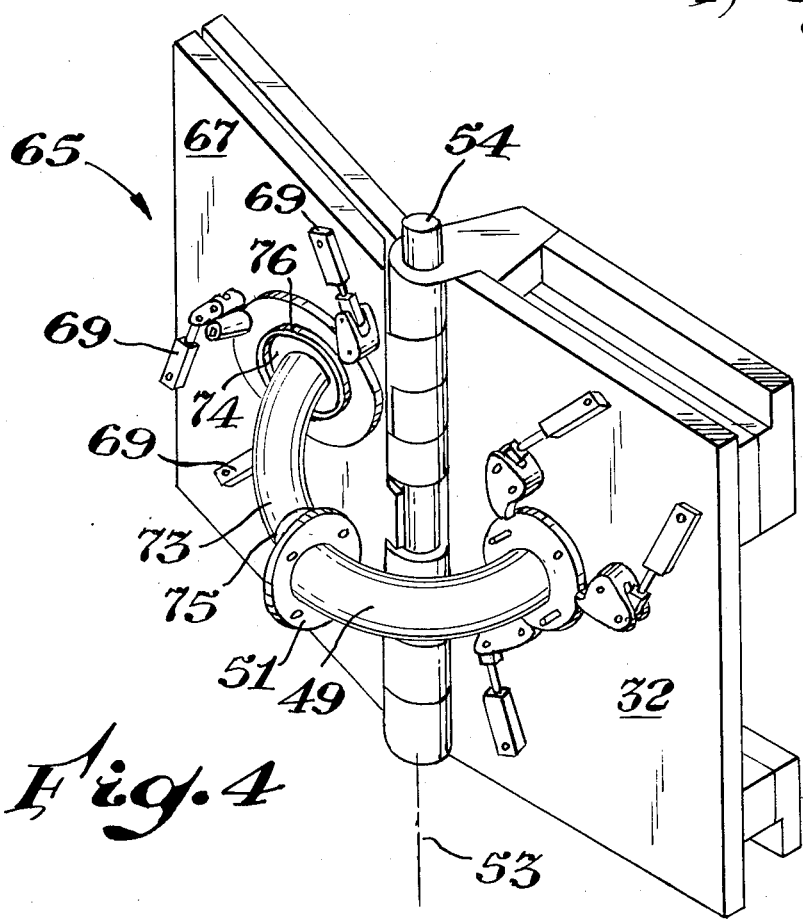
FIG. 4 depicts the apparatus of FIG. 3 in the open position.

In FIG. 4 there is depicted a view of the apparatus of FIG. 3 wherein the clamping members 69 have been disengaged from flange 51 of the elbow 49 and platen 65 has been rotated about 100 degrees to a position where faces 67 and 32 are almost but not quite parallel. In FIG. 4 a mandrel 73 is shown. The mandrel has a first or support end 74 and a second or remote end 75. The mandrel 73 has a configuration of a segment of a torus with its center of rotation being generally at the axis 53 of shaft 54. The face 67 of platen 65 depicts a flange engaging portion designated by the reference numeral 76 which is generally concentrically disposed about the end 74 of the mandrel 73.

Figure 5:
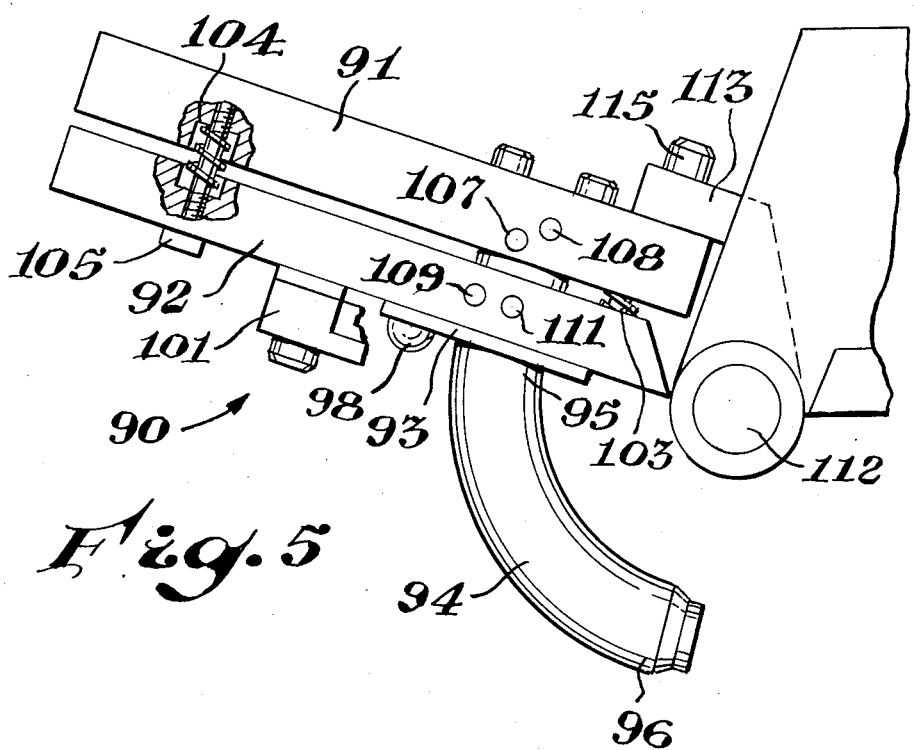
FIG. 5 is a schematic partially cutaway view of a mandrel support platen.

In FIG. 5 there is depicted a fractional view of a platen generally designated by the reference numeral 90. The platen 90 is equivalent to the platen 23 of FIGS. 1 and 2 and platen 65 of FIGS. 3 and 4. The platen 90 comprises a support plate 91 which has resiliently supported thereon an elbow engaging plate 92 and rigidly affixed thereto an arcuate mandrel 94. The plate 92 has an elbow engaging face 93. The mandrel 94 has a support end 95 and a remote end 96. The mandrel 94 is generally equivalent to the mandrel 73 of FIGS. 3 and 4. Generally adjacent the mandrel 94, the face 93 supports a locating pin 98. The locating pin 98 is generally adapted to engage a bolt hole in an elbow to be lined. Desirably two locating pins are employed. For clarity only one clamping means 101 is shown disposed on the face 93 of the plate 92. The actuating cylinders and the remaining two clamps are not shown. The plate 92 is resiliently supported by the plate 91 by a plurality of spring members in combination with bolts. One of such spring members is designated by the reference numeral 103. A second spring member is indicated by the reference numeral 104. The spring member 104 is disposed in adjacent recesses in plates 91 and 92. A bolt or cap screw 105 passes through plate 92 through the spring 104 and threadably engages plate 91. The resilient mounting of plate 92 permits positive engagement of the face of the flange such as flange 27 of FIGS. 1 and 2 in the event of minor misalignment of the flange faces. Generally such pipe fittings are prepared by a casting process and minor misalignment is not an unusual occurrence.

As depicted in FIG. 5, plate 91 shows two openings 107 and 108 which communicate with passageways within the plate 91 and permit the circulation of cooling liquid such as water with the mandrel 94. Plate 92 defines two openings 109 and 111 which provide communication with space internal to the plate 92, and permit circulation of cooling liquids such as water therein. The plate 91 is rigidly affixed to a shaft 112 by means of a plurality of brackets 113, only one shown, and held by bolt or cap screw 115. A mandrel 94 is shown bolted to plate 91.

Figure 6:
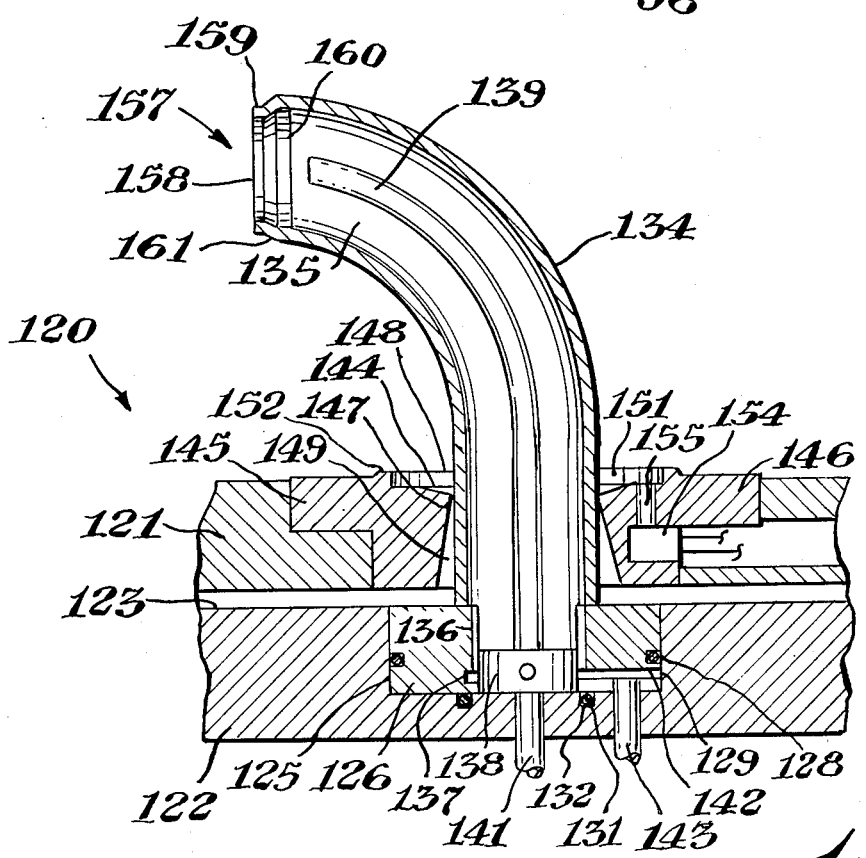
FIG. 6 is a fractional sectional view of a mandrel support platen.

In FIG. 6 there is depicted a fractional sectional schematic view of a mandrel carrying platen assembly generally designated by the reference numeral 120. The assembly 120 comprises a resiliently supported plate member 121, generally equivalent to plate 92 of FIG. 5 and a support plate 122, generally equivalent to plate 91 of FIG. 5. The plate 122 has a support face 123 disposed generally adjacent plate 121. Plate 122 has defined therein a generally cylindrical cavity 125 which terminates at face 123. Within the cavity 125 is a generally cylindrical insert 126. Insert 126 is in sealing engagement with the walls of the cavity 125 having an O-ring 128 disposed within an outwardly facing annular groove 129 defined by the insert 126. A second O-ring 131 disposed within an annular groove 132 of the bottom of the cavity 125 also provides a liquid tight seal. The insert 126 has affixed thereto an arcuate hollow mandrel 134. The mandrel 134 defines an internal space 135. An insert 126 defines a plurality of generally axially extending passageways 136 communicating with space 135 internal to the mandrel 134 and a generally annular plenum 137 defined within the insert 126 and a generally cylindrical insert block 138. An arcuate conduit 139 is disposed partially within the mandrel 134. The conduit 139 extends through insert 126, cylindrical block 138 and is in communication with conduit 141. A generally radially extending passage 142 is defined within the insert 126 and communicates with conduit 143 disposed external to plate 122. Cooling water can be applied to conduit 141 to be discharged from conduit 139 into mandrel 134 at a location remote from plate 121. It will then be discharged through passageway 136, plenum 137, passageway 142 and conduit 143. Plate 121 defines an insert 145 of stepped configuration generally concentric about the mandrel 134. Disposed within the stepped cavity is a flange engaging insert 146. The insert 146 defines a centrally disposed passageway 147 extending in a direction generally normal to surface 123. The passageway 147 has a minimum diameter remote from the surface 123 which approximates the diameter of the mandrel and increases in diameter toward face 123. Passageway 147 is of generally frustoconical configuration. The insert 145 defines a second recess concentric with and in communication with a passageway 148. The passageway or recess 148 comprises a generally cylindrical portion 151 a first generally frustoconical portion 144 disposed adjacent portion 151, a passageway 147 in communication with portion 144, and a second frustoconical portion 149 remote from passageway 147. The insert 145 has a land 152 surrounding the passageway 148. A pressure transducer 154 is disposed within insert 145 and is in contact with a pressure transmitting pin 155.

The mandrel 134 terminates in a second or fixed platen engaging end 157. The end 157 has a terminal flat discoidal face 158 of a diameter smaller than the mandrel but approximating the diameter of the mandrel. Adjacent the face 158 is a short cylindrical section 159 of equal diameter to the face 158 and a frustoconical section 161 between the cylindrical section 159 and the major diameter of the mandrel 134 adjacent the frustoconical section 16 distal to the end 157 is face 160.

In FIG. 7 there is a fractional sectional view of the fixed platen in the region of engagement by a mandrel such as the mandrel 73 of FIG. 4, mandrel 94 of FIG. 5 and mandrel 134 of FIG. 6, generally designated by the reference numeral 170. The assembly 170 comprises a main platen 171 having defined therein a stepped cavity 172. The cavity 172 has a portion of major diameter adjacent face 173 of the platen 171. The face 173 is a face generally adjacent the mandrel when the mandrel is inserted into an elbow clamped thereon. Within the stepped cavity 172 is disposed a first insert 174 of generally cylindrical configuration. The insert 174 has a first end 175 and a second end 176. The first end 175 of insert 174 defines a nozzle receiving depression 177. The insert 174 defines a generally axially extending passageway 178 which provides communication between the depression 177 and second end 176 of the insert 174. The passageway 178 is enlarged adjacent second end 176 and defines a generally outwardly flaring frustoconical region 179 having disposed therein 4 centering projections 181, three shown. The second end 176 of the insert 174 defines a generally shallow cylindrical cavity 182 which is in full communication with passageway 178. Disposed adjacent second end 176 is a second or molding insert 184. The insert 184 has a first or non-molding face 185 disposed adjacent to and generally coextensive with a second end 176 of the insert 174. The insert 184 has a molding face 187 remotely disposed from insert 174 and generally in the plane of face 173. The insert 184 defines a generally centrally disposed cylindrical opening 188 which is coaxial with passageway 178 and of about equal diameter to the terminal portion of passageway 178, adjacent the end 176 of insert 174. Passageway 188 is in full communication with a generally frustoconical outwardly flaring passageway 189. Passageway 189 in turn is in full communication with a generally cylindrical region 191 defined in part by a land 192 having an inside diameter equal to the cylindrical region 191. A heating band 193 surrounds the insert 174.

Figure 8:
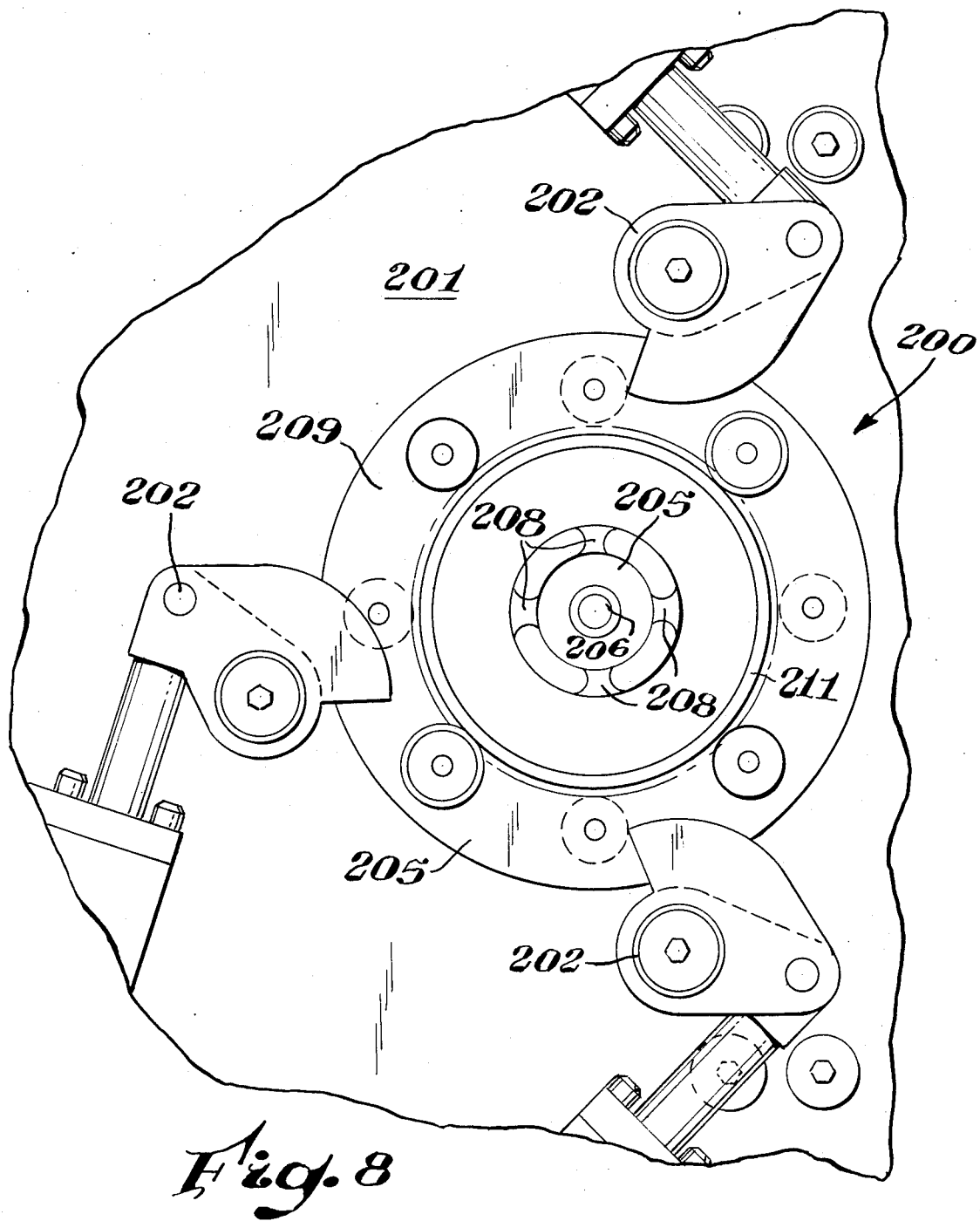
FIG. 8 is a face view of a portion of a stationary platen.

In FIG. 8 there is depicted a fractional view of a fixed platen similar to the platen of FIG. 7. The platen is generally indicated by the reference numeral 200. The platen 200 has a molding face 201 having disposed thereon three clamping means 202. Clamping means 202 are shown in the flange engaging position. The platen 200 defines an opening 203 into which are positioned 2 inserts in the manner generally depicted in FIG. 7. A first insert 205 defines a resin supply passageway 206 having 4 centering bosses or protrusions which are designated by the reference numeral 208. A second insert 209 defines a land 211 which is generally concentric with the passageway 206.

In operation of the apparatus and practice of the method of the invention, an apparatus such as is depicted in FIGS. 1 and 2 and employing a mold generally in accordance with FIG. 4, the pivoting platen is pivoted to a point where an elbow, either a 90 degree or 45 degree elbow, is clamped to the fixed platen. The hinged platen or movable platen is then rotated to insert the mandrel into the elbow to an extent sufficient to seat the end of the mandrel such as the end 157 and 158 of FIG. 6 against the insert, such as depicted in FIG. 7 wherein the cylindrical portions such as the portion 159 of FIG. 6 is between the locating pins 181 of FIG. 7. The flange adjacent the moving or pivotable platen is clamped, heat plastified synthetic resin is forced into a space defined between a mandrel and the elbow while the resin is also forced between the adjacent flange and insert such as insert 184 of FIG. 7 and insert 146 of FIG. 6 to provide a flange on the liner which conforms to the flange on the elbow being lined. Particular conditions such as time and temperature are readily varied by those skilled in the molding art to obtain desired results with any particular thermoplastic resinous material being used for the lining of elbows. Advantageously, rotary actuators such as actuator 28 of FIG. 1 is a hydraulic actuator of sufficient power to withdraw the generally cylindrical mandrel such as the mandrel 94 of FIG. 5, the mandrel 134 of FIG. 6 from the lined fitting. Torque required will depend upon the size of the elbow and the nature of the material employed for lining. If desired, the mandrel such as the mandrels 73 of FIG. 4, the mandrel 94 of FIG. 5 and mandrel 134 of FIG. 6 can be tapered slightly with the diameter decreasing as the distance from the movable platen increases. The method and apparatus of the present invention provides highly desirable synthetic resinous liners within the flanged elbows.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. An apparatus comprising: a first clamping platen, the first clamping platen having a first face, the first clamping platen defining a passageway adapted to receive and transmit heat plastified synthetic resinous thermoplastic material through said first face; a clamping means in cooperative combination with said first face, said clamping means adapted to engage a flange of a pipe elbow and maintain the flange of the pipe elbow in sealing engagement with said first face in a location wherein material from the resin receiving passageway can enter the elbow; a second clamping platen having a first face, the first and second platens being hingedly affixed to each other, the second clamping platen being selectively positionable relative to the first platen wherein the first and second platens are generally pivoted relative to one another; the second platen having disposed thereon a hollow arcuate mandrel adapted to enter and be removed from a passageway within the pipe elbow clamped on the first face of the first platen with the second platen pivoting relative to the first platen; the mandrel having a terminal end remote from the first face of the second platen, the terminal end of the mandrel adapted to engage a portion of the first face of the first platen in a region of the receiving passageway such that the receiving passageway is adapted to communicate with a space defined between the elbow and the mandrel; means for discharging cooling water into the hollow mandrel and for withdrawing the cooling water from the mandrel, the first face of the second platen having associated therewith clamping means adapted to engage the flange of the pipe elbow clamped to the first face of the first platen; and means to pivotally position the second platen relative to the first platen.

2. The apparatus of claim 1 wherein the second clamping platen comprises first and second plate-like members resiliently tensioned apart and generally parallel, with second plate-like member being hingedly affixed to the first clamping platen, the first plate-like member being disposed generally adjacent the first clamping platen, the first plate-like member defining a generally centrally disposed aperture, the arcuate mandrel passing through the aperture.

3. The apparatus of claim 2 wherein the first plate-like member defines a stepped aperture about the arcuate mandrel, the stepped aperture having disposed therein an insert which closely conforms to the arcuate mandrel.

4. The apparatus of claim 1 including a hydraulic motor in association with the second clamping platen adapted to move the arcuate mandrel toward or away from the first clamping platen.

5. The apparatus of claim 1 wherein the clamping means comprises hydraulic cylinders in association with cam clamps.

6. The apparatus of claim 5 wherein each clamping platen has disposed thereon 3 clamps.

7. The apparatus of claim 1 wherein the first clamping platen is in operative combination with an injection molding machine.

8. A method for the lining of pipe elbows with a synthetic resinous thermoplastic material, the method comprising clamping a flanged elbow between first and second pivotally attached platens, the elbow being clamped by a first flange of the elbow on the first platen, inserting an arcuate mandrel supported by the second platen into the elbow clamped on the first platen, clamping the receiving flange of the elbow on the second platen, injecting a heat plastified synthetic resin into a space defined between the mandrel and elbow, cooling the injected synthetic resinous material to a temperature below its thermoplastic temperature to form a lining on the elbow, unclamping the flange of the elbow adjacent the mandrel supporting platen, withdrawing the mandrel from the elbow and unclamping the remaining clamped flange of the elbow.

9. The apparatus of claim 1, wherein the second platen comprises a support plate having an elbow-engaging plate resiliently supported thereon and having an arcuate mandrel rigidly affixed thereto, said elbow engaging plate having an elbow engaging face, the elbow engaging plate being resiliently supported by a plurality of spring members each of which is disposed in adjacent recesses in the support plate and the elbow-engaging plate, a bolt passing through each spring and threadably engaging the support plate, whereby the resilient mounting of the elbow-engaging plate permits positive engagement of the face of the flange in the event of minor misalignment.

* * * * *